(12) United States Patent
Nakahara

(10) Patent No.: US 10,136,006 B2
(45) Date of Patent: Nov. 20, 2018

(54) IMAGE PROCESSING DEVICE THAT PROCESSES AN IMAGE BY ACQUIRING PROCESSING INFORMATION BASED ON A PROCESSING IDENTIFIER

(71) Applicant: FUJI XEROX CO., LTD., Tokyo (JP)

(72) Inventor: Toshiaki Nakahara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/211,912

(22) Filed: Jul. 15, 2016

(65) Prior Publication Data

US 2017/0272585 A1 Sep. 21, 2017

(30) Foreign Application Priority Data

Mar. 17, 2016 (JP) .................................. 2016-053245

(51) Int. Cl.
*H04N 1/00* (2006.01)
*H04N 1/21* (2006.01)

(52) U.S. Cl.
CPC ..... *H04N 1/00244* (2013.01); *H04N 1/00538* (2013.01); *H04N 1/21* (2013.01); *H04N 2201/0094* (2013.01)

(58) Field of Classification Search
None
See application file for complete search history.

(56) References Cited

U.S. PATENT DOCUMENTS

| 2008/0252922 | A1* | 10/2008 | Ikegami | H04L 63/083 358/1.15 |
| 2010/0259799 | A1* | 10/2010 | Shibao | H04N 1/00217 358/448 |
| 2011/0102833 | A1* | 5/2011 | Torii | H04N 1/4433 358/1.15 |

FOREIGN PATENT DOCUMENTS

| JP | 2007-074370 A | 3/2007 |
| JP | 2008-263557 A | 10/2008 |
| JP | 2011-041129 A | 2/2011 |

* cited by examiner

*Primary Examiner* — Andrew H Lam
(74) *Attorney, Agent, or Firm* — Oliff PLC

(57) ABSTRACT

An image processing device including a reception unit, an acquisition unit, an image reading unit, and a transmission unit. The reception unit receives a processing identifier associated with image reading processing. The acquisition unit acquires processing information associated with the processing identifier, the processing information including at least information regarding a storing location. The image reading unit reads an image on the basis of the processing information. The transmission unit transmits data of the read image to the storing location according to the processing information.

8 Claims, 13 Drawing Sheets

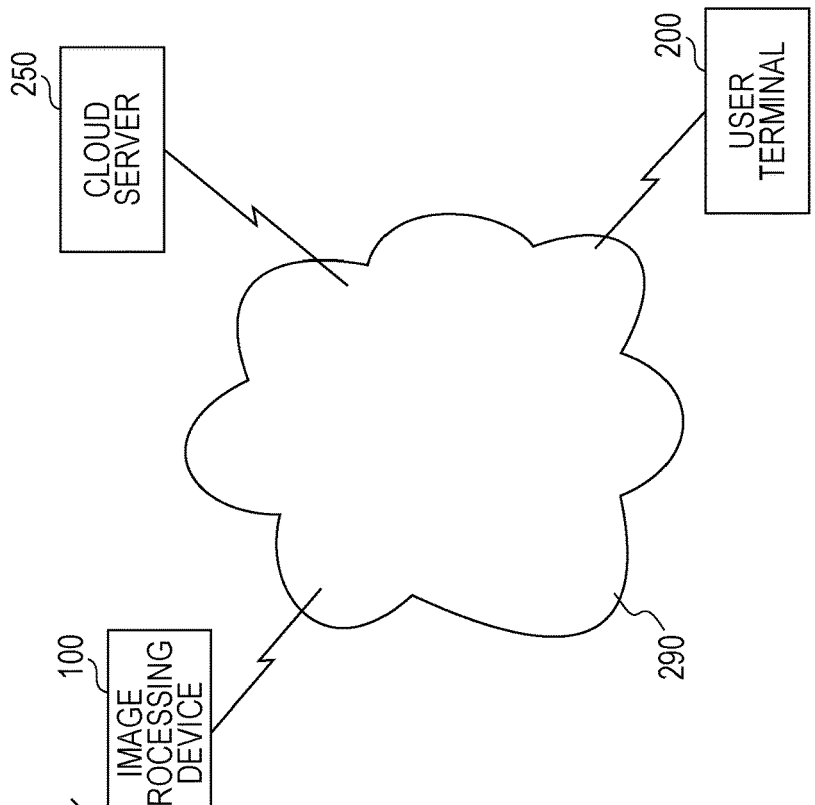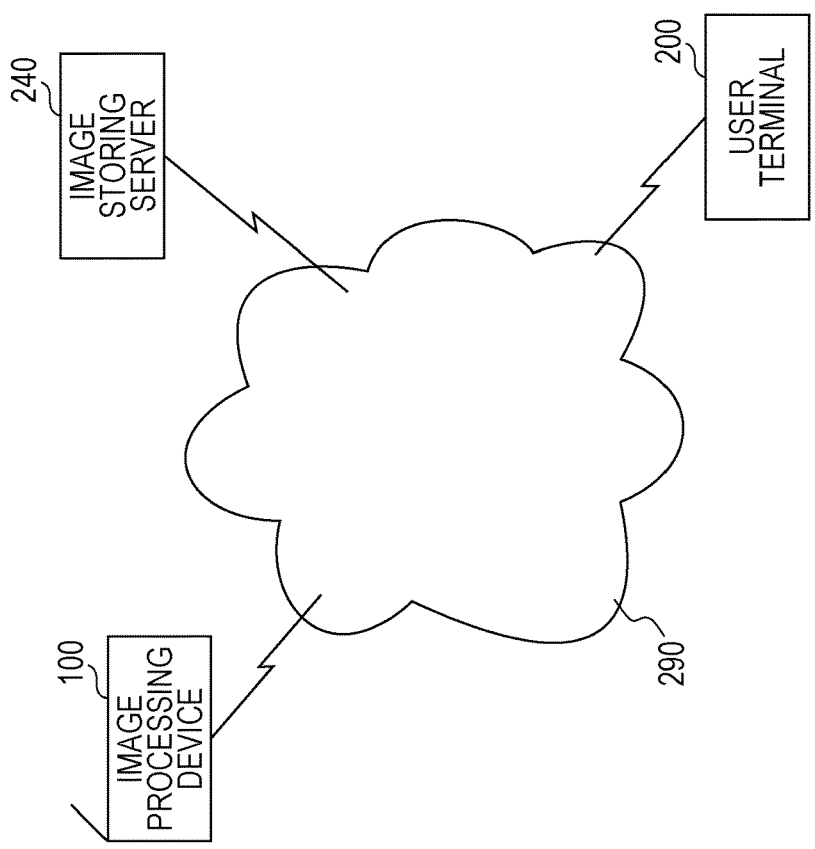

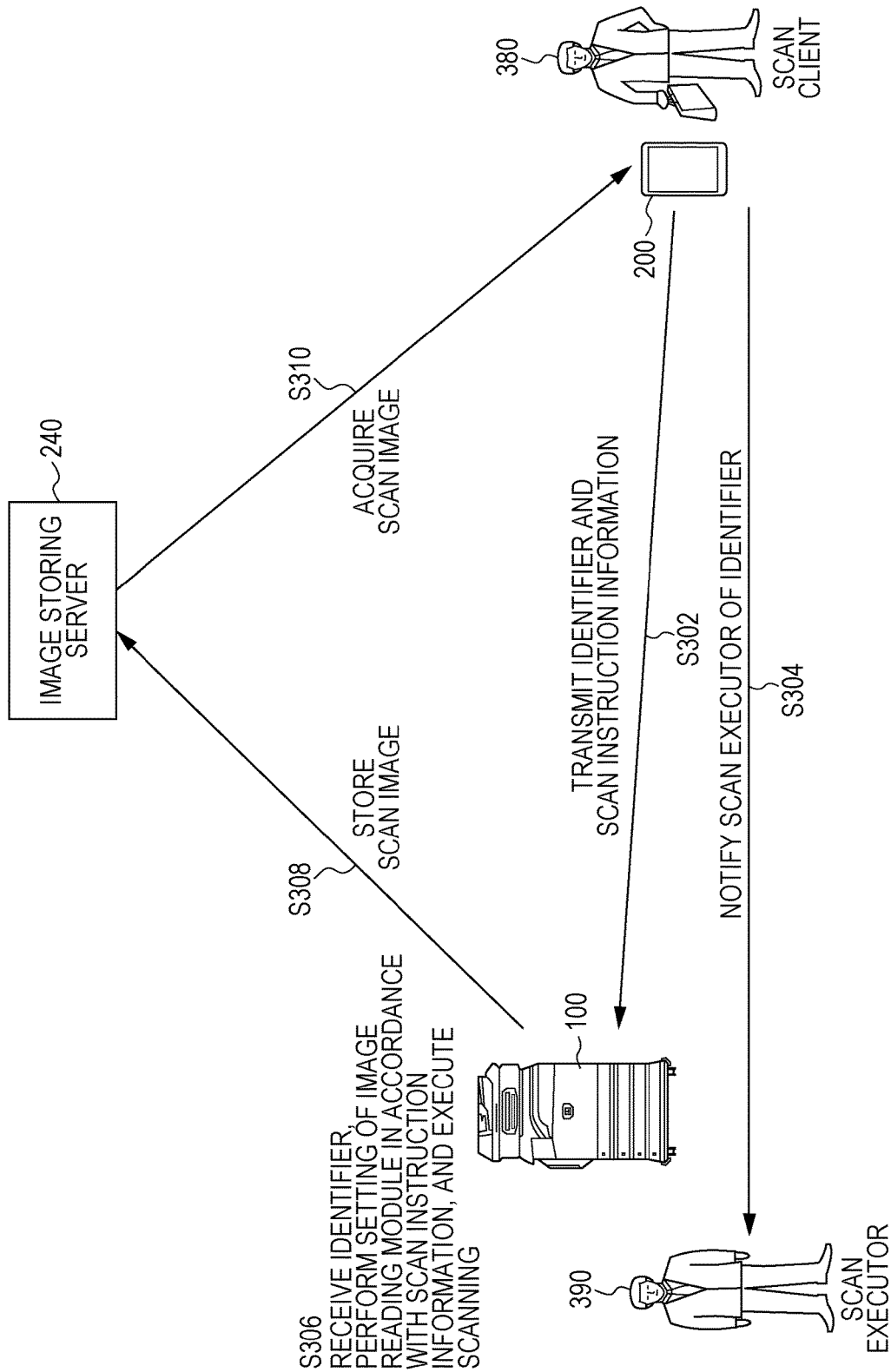

FIG. 5

| NAME OF PARAMETER | | EXAMPLE OF SPECIFICATION | NOTE |
|---|---|---|---|
| IDENTIFIER | | 1234567890 | |
| SCAN INSTRUCTION INFORMATION | SCAN SIZE | A4 | A3 .. |
| | COLOR/MONOCHROME | COLOR | MONOCHROME COLOR |
| | RESOLUTION | 300 dpi | |
| | DOCUMENT TYPE | tiff | jpg .. |
| SCAN EXECUTING DEVICE | | device-a-sado-mf | SCANNER A |
| SCAN IMAGE STORING LOCATION | | cloud://local.net/yamaguchi/scandata/ | UPLOAD LOCATION |

500

510 — IDENTIFIER
522 — SCAN SIZE
524 — COLOR/MONOCHROME
520 — SCAN INSTRUCTION INFORMATION
526 — RESOLUTION
528 — DOCUMENT TYPE
530 — SCAN EXECUTING DEVICE
540 — SCAN IMAGE STORING LOCATION

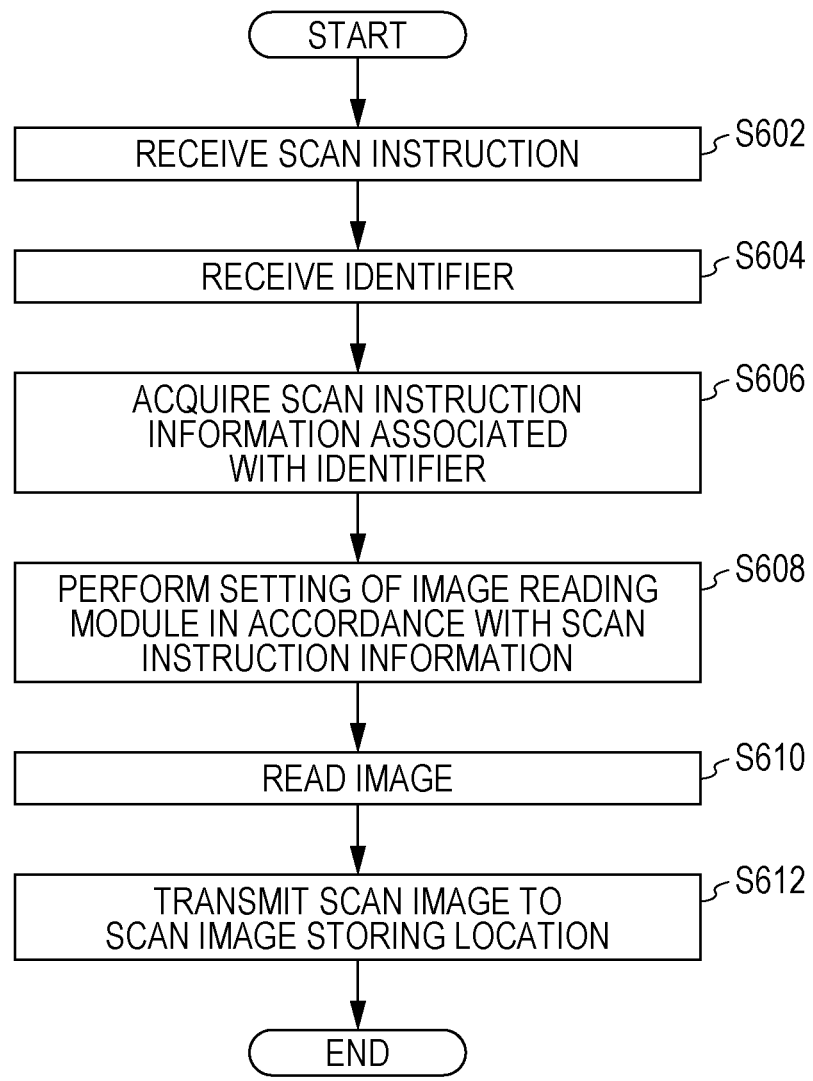

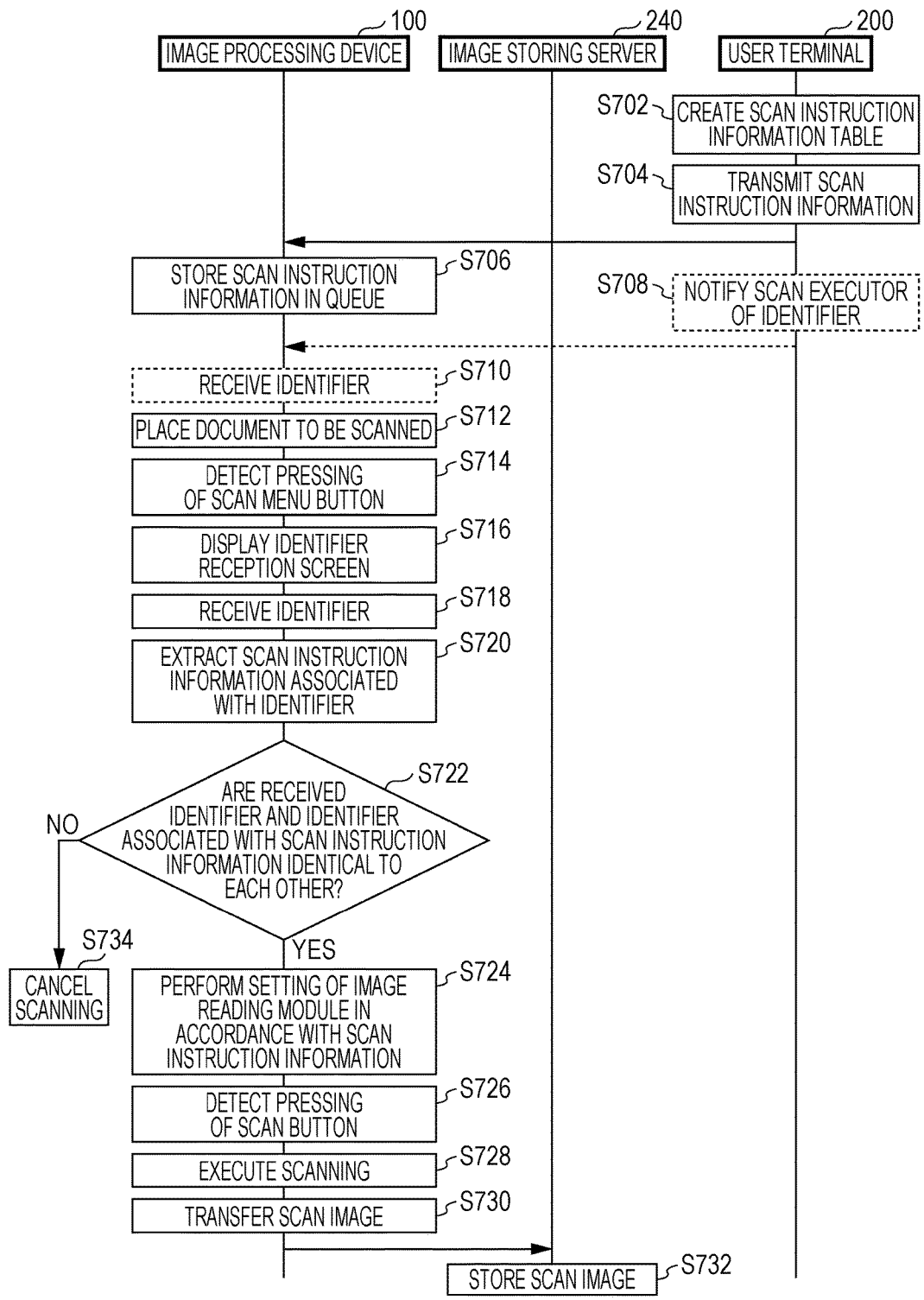

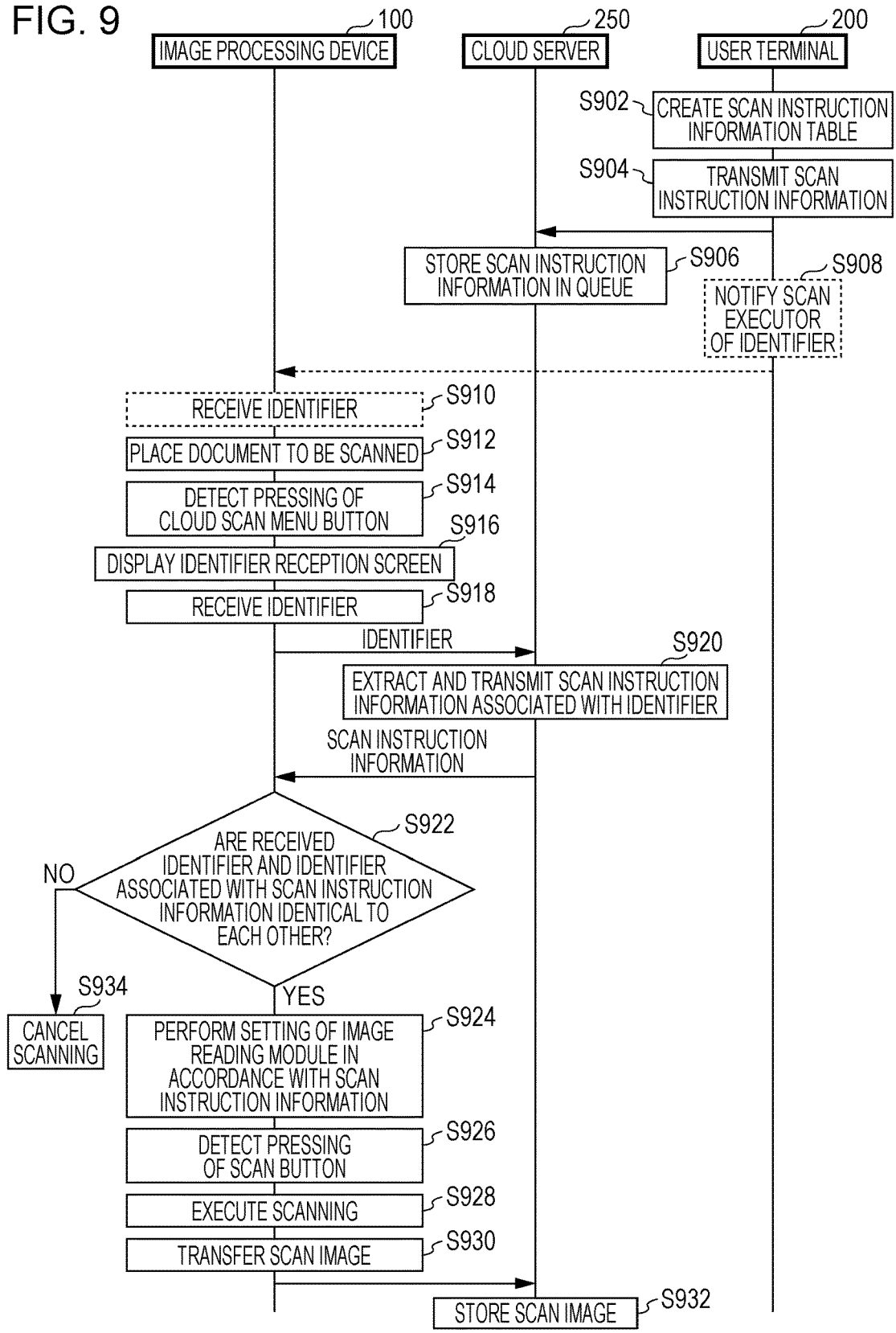

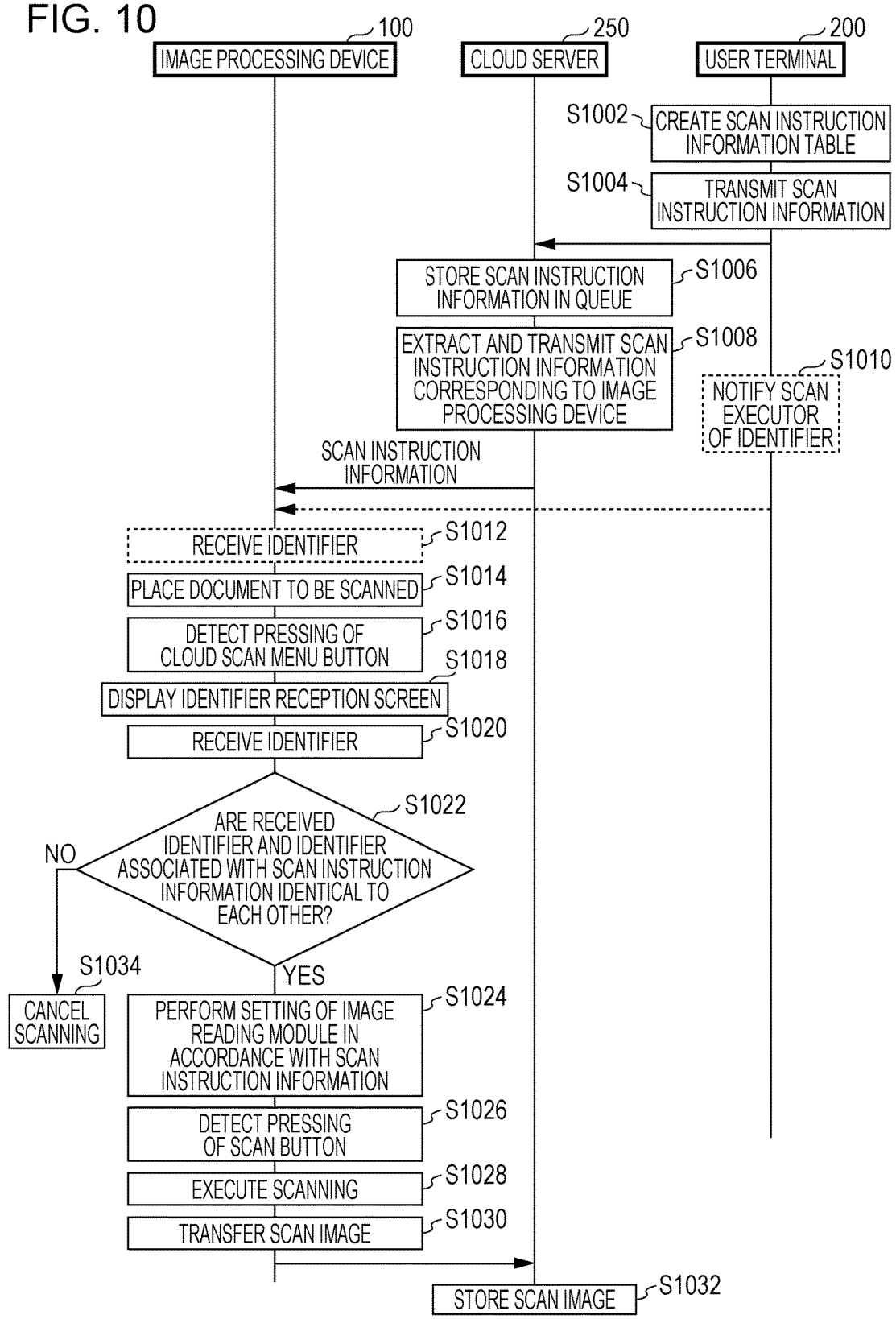

FIG. 11

| NAME OF PARAMETER | | EXAMPLE OF SPECIFICATION | NOTE |
|---|---|---|---|
| IDENTIFIER | | 1234567890 | |
| SCAN INSTRUCTION INFORMATION | SCAN SIZE | A4 | A3 ⋮ |
| | COLOR/MONOCHROME | COLOR | MONOCHROME COLOR |
| | RESOLUTION | 300 dpi | |
| | DOCUMENT TYPE | tiff | jpg ⋮ |
| SCAN EXECUTING DEVICE | | device-a-sado-mf | SCANNER A |
| SCAN IMAGE STORING LOCATION | | cloud://local.net/yamaguchi/scandata/ | UPLOAD LOCATION |
| SCAN CLIENT | | Tanaka Ichiro | |

1100

1110 IDENTIFIER
1122 SCAN SIZE
1124 COLOR/MONOCHROME
1120 SCAN INSTRUCTION INFORMATION
1126 RESOLUTION
1128 DOCUMENT TYPE
1130 SCAN EXECUTING DEVICE
1140 SCAN IMAGE STORING LOCATION
1150 SCAN CLIENT

IMAGE PROCESSING DEVICE THAT PROCESSES AN IMAGE BY ACQUIRING PROCESSING INFORMATION BASED ON A PROCESSING IDENTIFIER

CROSS-REFERENCE TO RELATED APPLICATIONS

This application is based on and claims priority under 35 USC 119 from Japanese Patent Application No. 2016-053245 filed Mar. 17, 2016.

BACKGROUND

Technical Field

The present invention relates to an image processing device, an image processing method, and a non-transitory computer readable medium.

SUMMARY

According to an aspect of the invention, there is provided an image processing device including a reception unit, an acquisition unit, an image reading unit, and a transmission unit. The reception unit receives a processing identifier associated with image reading processing. The acquisition unit acquires processing information associated with the processing identifier, the processing information including at least information regarding a storing location. The image reading unit reads an image on the basis of the processing information. The transmission unit transmits data of the read image to the storing location according to the processing information.

BRIEF DESCRIPTION OF THE DRAWINGS

An exemplary embodiment of the present invention will be described in detail based on the following figures, wherein:

FIGS. 2A and 2B each illustrate a system configuration example using the exemplary embodiment;

FIG. 3 illustrates a process example according to the exemplary embodiment;

FIG. 5 illustrates a data structure example of a scan instruction information table;

FIG. 6 is a flowchart illustrating a part of the process example according to the exemplary embodiment;

FIG. 7 is a flowchart illustrating a part of the process example according to the exemplary embodiment;

FIG. 9 is a flowchart illustrating a part of the process example according to the exemplary embodiment;

FIG. 10 is a flowchart illustrating a part of the process example according to the exemplary embodiment;

FIG. 11 illustrates a data structure example of a scan instruction information table;

DETAILED DESCRIPTION

An exemplary embodiment to implement the present invention is now described below with reference to the drawings.

Figure 1:
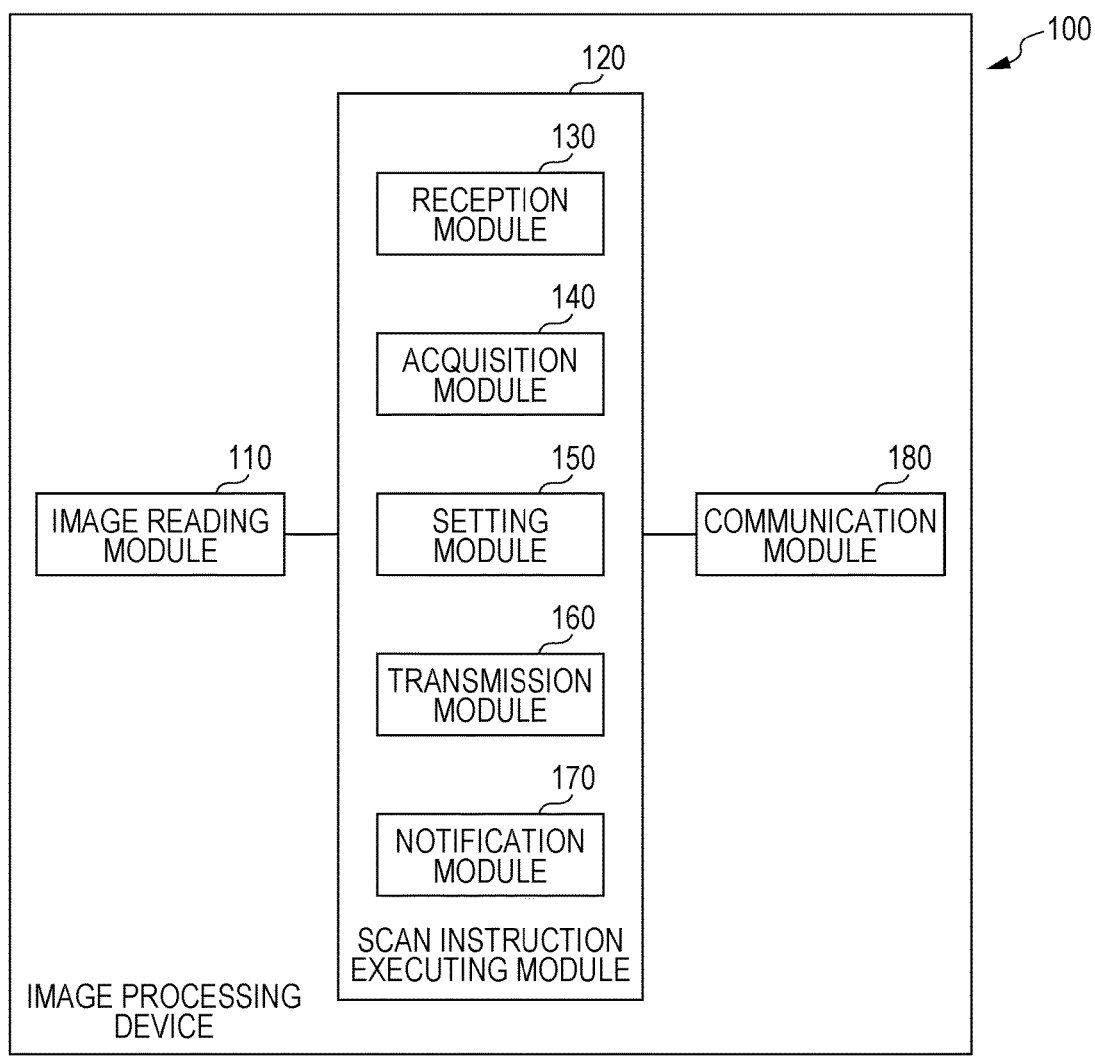
FIG. 1 illustrates a conceptual diagram illustrating a module configuration example according to the exemplary embodiment.

FIG. 1 is a conceptual diagram illustrating a module configuration example according to the exemplary embodiment.

Note that the term "module" generally means a logically separable component of software (computer program), hardware, or the like. Accordingly, a module in the exemplary embodiment refers to not only a module in a computer program but also a module in a hardware configuration. Therefore, the exemplary embodiment will also illustrate a computer program for realizing the function of such a module (a program for causing a computer to execute each step, a program for causing a computer to function as each unit, or a program for causing a computer to realize each function), a system therefor, and a method therefor. For the convenience of description, "store Y", "cause X to store Y", or a similar expression will be used. In an exemplary embodiment illustrating a computer program, such an expression means to cause a memory device (X) to store Y or to perform control in such a manner as to cause a memory device (X) to store Y. Modules and functions may correspond to each other in a one-to-one relationship. Alternatively, in implementation, a single program may realize a single module or plural modules. Conversely, plural programs may realize a single module. Plural modules may be executed by a single computer, or a single module may be executed by plural computers in a distributed or parallel environment. In addition, a single module may include another module. The term "connect" is herein used to describe a physical connection or a logical connection (e.g., data transfer, instruction transmission, or data cross-reference). The term "predetermined" means a state where something is determined prior to a target process and includes the meaning of not only being determined before the starting of a process according to the exemplary embodiment but also being determined before the target process even after the starting of a process according to the exemplary embodiment, in accordance with the current or previous status and conditions. If there are plural "predetermined values", these values may be mutually different values, or two or more values may be the same (it is needless to say that all the values may be the same). In addition, an expression such as "if A, B" is used to indicate that whether or not A is determined, and if it is determined that A, then B. However, this does not apply to the case where the determination as to whether or not A is unnecessary.

Furthermore, a system or a device may be configured by connecting plural computers, hardware components, devices, and the like to one another by using a communication unit, such as a network (including one-to-one-correspondence communication connection), or may be configured by a single computer, hardware component, device, and the like. Note that the terms "system" and "device" are used as synonyms. It may be needless to say that the term "system" does not mean a social mechanism (social system), which is settled by humans.

Furthermore, in the case where plural processes are performed by the respective modules or within a module, target information is read from a memory device in each process, and after the process has been performed, the process result is written to the memory device. Accordingly, description of the reading of information from the memory device before a process and the writing of information to the memory device after the process will be omitted in some cases. Note that examples of the memory device herein may include a hard disk, a random access memory (RAM), an external memory medium, a memory device connected via a communication line, and a register in a central processing unit (CPU).

An image processing device 100 according to the exemplary embodiment allows a scan executor to perform image reading in accordance with a setting performed by a scan client and includes an image reading module 110, a scan instruction executing module 120, and a communication module 180 as illustrated in the example of FIG. 1. Specifically, the scan client specifies scan parameters and an image storing location, and then data of an image that the scan executor has instructed to scan is transferred through a network. Note that the scan executor is a different person from the scan client.

The image reading module 110 is connected to the scan instruction executing module 120 and reads an image of a document that is placed on the image processing device 100. That is, the image reading module 110 is a so-called scanner. The image is read in accordance with a setting of scan parameters. A single image may be read, or plural images may be read. Although the content of the image is not limited to a particular content, the image is typically of a document that the scan client has instructed the scan executor to scan or a document that the scan executor desires to transmit to the scan client. For example, the image may be of a document used for business, a family tree, or the like.

The scan instruction executing module 120 includes a reception module 130, an acquisition module 140, a setting module 150, a transmission module 160, and a notification module 170 and is connected to the image reading module 110 and the communication module 180. The scan instruction executing module 120 performs a process in accordance with the scan parameters and the image storing location specified by the scan client.

The reception module 130 receives a processing identifier (also referred to as a personal identification number (PIN) code, and hereinafter also referred to as an identifier) associated with image reading processing. For example, the reception module 130 receives a processing identifier through an operation (specifically, an operation on a touch panel, a voice, a line of sight, a gesture, or the like) performed by the scan executor on a user interface device (specifically, a touch panel, a mouse, a keyboard, a microphone, a camera, or the like) provided for the image processing device 100. The processing identifier here includes characters (e.g., numbers, letters, katakana, hiragana, or kanji). Such characters may be input by using a keyboard or the like. Alternatively, an information image from which such characters are readable may be read. Note that the term "information image" refers to a machine readable image code that is systematically formed to indicate electronic data, and is specifically a one-dimensional barcode, a two-dimensional code, or the like. As a two-dimensional code, a quick response (QR) code (registered trademark) may be used.

Note that the scan client notifies the scan executor of the processing identifier in advance. As the notification method, for example, the scan client may convey the processing identifier verbally (typically over the telephone since the scan executor is at a distant location), by mail, or by email, for example. In the case of using an information image including the processing identifier, a sheet of paper on which the information image has been printed may be handed, or data thereof may be transmitted by email or the like. The scan executor causes a camera (barcode reader) of the image processing device 100 to read the information image.

The acquisition module 140 acquires processing information (hereinafter also referred to as scan instruction information) associated with the processing identifier received by the reception module 130. The processing information here includes at least scan parameters and information regarding an image storing location.

The acquisition module 140 may acquire the processing information associated with the processing identifier from a server. Examples of the server include a cloud server 250, which will be described later with reference to FIG. 2B, and other servers. The processing identifier is transmitted to the server, and the server transmits processing information associated with the processing identifier, and accordingly, receiving the processing information may suffice. Instead of using a server, processing information transmitted from, for example, a user terminal 200 owned by the scan client may be received, and the received processing information may be stored in a memory device included in the image processing device 100 so that the processing information associated with the processing identifier is acquired from the memory device.

In addition, if there are plural pieces of processing information associated with a single processing identifier, the acquisition module 140 may display an error message indicating that plural pieces of processing information are associated with a single processing identifier.

If the acquired processing information lacks one or more scan parameters for the image reading module 110, the acquisition module 140 may receive the lacking scan parameters through an operation performed by an operator.

In addition, if the acquired processing information lacks one or more scan parameters for the image reading module 110, the acquisition module 140 may notify a person who has created the processing information (the above-described scan client) of the lack of scan parameters by email or the like. Then, the lacking scan parameters may be compensated for by using scan parameters included in a reply email.

The setting module 150 sets, in the image reading module 110, the scan parameters included in the processing information acquired by the acquisition module 140. The scan parameters here include, for example, a scan size, specification about color/monochrome, a resolution, a document type, and the like.

Once the setting module 150 sets the scan parameters, the image reading module 110 reads the image. That is, the image reading module 110 reads the image on the basis of the processing information acquired by the acquisition module 140.

In addition, the image reading module 110 may display, upon reception of the processing identifier, information regarding a scan client included in the processing information associated with the processing identifier. Furthermore, the image reading module 110 may read, upon reception of a confirmation operation, the image on the basis of the processing information. That is, the image is read if the notification module 170 receives the confirmation operation.

In the case where a valid period is set for the processing information, the setting module 150 may determine whether or not the current time is within the valid period. If the current time is not within the valid period, the setting module 150 may not set the scan parameters included in the processing information. In this case, the setting module 150 may display an error message indicating that the current time is not within the valid period and may disenable scanning.

In the case where the processing information includes an encryption code, the setting module 150 may receive an encryption code through an operation performed by the scan executor. In this case, it is determined whether or not the encryption code included in the processing information is identical to the encryption code acquired through the operation performed by the scan executor. If the encryption codes are identical to each other, the scan parameters may be set in the image reading module 110; if not, the scan parameters may not be set, disenabling scanning.

The transmission module 160 transmits, to the storing location according to the processing information, data of the image read by the image reading module 110.

In addition, the transmission module 160 may display information regarding the storing location prior to transmitting the data of the image read by the image reading module 110, and, upon reception of a confirmation operation, may transmit the data of the image to the storing location. That is, the data of the image is transmitted if the notification module 170 receives the confirmation operation.

Furthermore, if the scan parameters included in the processing information are not appropriate for image reading, the transmission module 160 may transmit, to the server, information indicating that the scan parameters are not appropriate for image reading.

Prior to transmitting the data of the image read by the image reading module 110, the notification module 170 displays information regarding the storing location and receives a confirmation operation. Thus, the scan executor is able to check the storing location. The term "confirmation operation" is an operation indicating that the transmission of the data of the image to the storing location is permitted, and the confirmation operation corresponds to, for example, a pressing of an "OK" button displayed on a display device, such as a liquid crystal display, of the image processing device 100. It is needless to say that the transmission module 160 does not transmit the data of the image if the transmission thereof is not permitted.

When the reception module 130 receives the processing identifier, the notification module 170 may display, on the display device, information regarding the scan client according to the processing information associated with the processing identifier and may receive a confirmation operation. Thus, the scan executor is able to check who the scan client is.

The communication module 180 is connected to the scan instruction executing module 120 and performs communication with the outside (e.g., the above-described server or the user terminal 200 owned by the scan client).

FIGS. 2A and 2B each illustrate a system configuration example using the exemplary embodiment.

In the example illustrated in FIG. 2A, the image processing device 100, the user terminal 200, and an image storing server 240 are connected to one another via a communication line 290. The communication line 290 may be a wireless line, a wired line, or a combination thereof, and may be, for example, a line to the Internet as a communication infrastructure, an intranet, or the like. Functions of the image storing server 240 may be realized as a cloud service.

The scan executor uses the image processing device 100, and the scan client uses the user terminal 200. Processing information is transmitted from the user terminal 200 to the image processing device 100. Then, a scan image (digital data) obtained as a result of image reading by the image processing device 100 is transmitted to the image storing server 240 (a storing location according to the processing information), and the image storing server 240 stores the scan image and transmits the scan image to the user terminal 200.

In the example illustrated in FIG. 2B, the image processing device 100, the user terminal 200, and a cloud server 250 are connected to one another via the communication line 290.

Processing information is transmitted from the user terminal 200 to be stored in the cloud server 250, and the image processing device 100 acquires the processing information from the cloud server 250. Then, the scan image obtained as a result of image reading by the image processing device 100 is transmitted to the cloud server 250 (a storing location according to the processing information), and the cloud server 250 stores the scan image and transmits the scan image to the user terminal 200.

FIG. 3 illustrates a process example according to the exemplary embodiment, which corresponds to the example illustrated in FIG. 2A.

In the related art (technology that does not use the exemplary embodiment), if a user (corresponding to a scan client 380) desires to acquire a scan image of a document at a distant location, the user acquires the scan image by, for example, asking the owner (corresponding to a scan executor 390) of the document at the distant location to scan the document and to upload the scan image thereof to a cloud server.

However, if the owner at the distant location is not accustomed to digital equipment, great efforts are made as follows: (a) the client goes to the distant location to scan the document to convert the document to digital data and stores the data in a cloud server; (b) the client asks the owner to send the document by mail to the client, converts it to a scan image, and sends back the document; and (c) the client asks another person who is accustomed to digital equipment to execute scanning. In addition, in the case where the client asks a person who is accustomed to digital equipment to execute scanning, a great burden is still imposed on the scan executor. This is because the client has to provide scan parameters (e.g., resolution, image format, and color/monochrome) and information regarding a scan image storing location that the client desires, and a scan executor, who has been asked to execute scanning, has to do the corresponding operation.

According to the exemplary embodiment, the user terminal 200 is used by the scan client 380, and the image processing device 100 is used by the scan executor 390. For example, the scan client 380 and the scan executor 390 are at distant locations from each other. Note that the scan client 380 and the scan executor 390 are not necessarily at distant locations as long as the scan client 380 asks the scan executor 390 to execute scanning. The image processing device 100, the user terminal 200, and the image storing server 240 are connected to one another via a communication line.

In step S302, the user terminal 200 transmits an identifier and scan instruction information to the image processing device 100 in accordance with an instruction issued by the scan client 380. The information transmitted here will be described later with reference to the example of FIG. 5.

In step S304, the scan client 380 notifies the scan executor 390 of the identifier. As described above, for example, the notification may be over the telephone.

Note that either of step S302 and step S304 may be performed earlier than the other.

In step S306, the image processing device 100 receives the identifier through an operation performed by the scan executor 390. Then, the image processing device 100 acquires the scan instruction information associated with the identifier, and sets, in the image reading module 110, the scan parameters included in the scan instruction information. The image processing device 100 scans a document to generate a scan image.

In step S308, the image processing device 100 stores the scan image in the image storing server 240, which is the storing location according to the scan instruction information.

In step S310, the user terminal 200 acquires the scan image from the image storing server 240.

Figure 4:
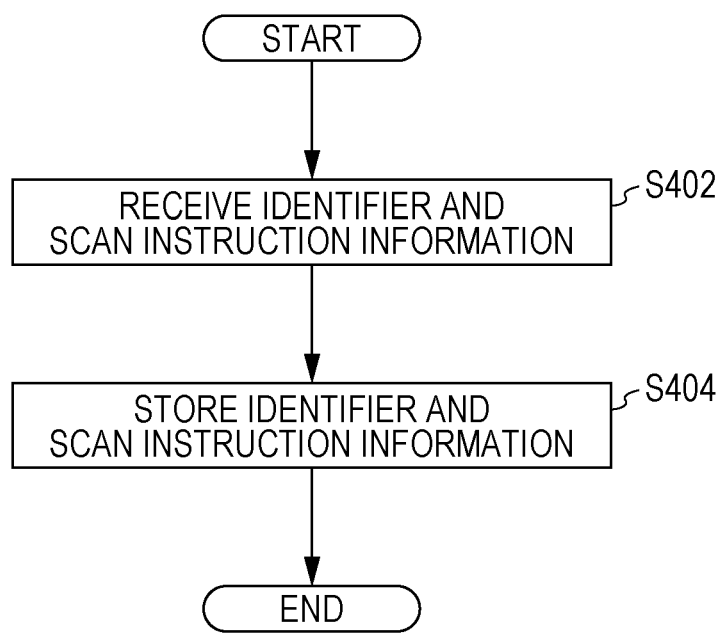
FIG. 4 is a flowchart illustrating a part of the process example according to the exemplary embodiment.

FIG. 4 is a flowchart illustrating a part of the process example according to the exemplary embodiment, which corresponds to step S302 illustrated in the example of FIG. 3.

In step S402, the image processing device 100 receives the identifier and the scan instruction information from the user terminal 200. For example, the image processing device 100 receives a scan instruction information table 500.

FIG. 5 illustrates a data structure example of the scan instruction information table 500. The scan instruction information table 500 includes an identifier field 510, a scan instruction information field 520, a scan executing device field 530, and a scan image storing location field 540. The scan instruction information field 520 includes a scan size field 522, a color/monochrome field 524, a resolution field 526, and a document-type field 528. The identifier field 510 stores the identifier. The identifier is associated with the following information: information in the scan instruction information field 520, the scan executing device field 530, and the scan image storing location field 540. Note that the identifier here may be created by the scan client 380, or may be automatically generated by the user terminal 200. An example of the content in the identifier field 510 is "1234567890" or the like. The scan instruction information field 520 stores scan instruction information. The scan size field 522 stores a scan size. An example of the content in the scan size field 522 is "A4", and another example thereof is "A3" or the like. The color/monochrome field 524 stores information regarding color/monochrome/etc. specification. An example of the content in the color/monochrome field 524 is "color", and another example thereof is "monochrome (binary image)", "gray image", or the like. The resolution field 526 stores a resolution. An example of the content in the resolution field 526 is "300 dpi", and another example thereof is "400 dpi" or the like. The document-type field 528 stores a document type. An example of the content in the document-type field 528 is "tiff", and another example thereof is "jpg" or the like. The scan executing device field 530 stores information regarding a scan executing device. The content in the scan executing device field 530 is the identifier (including the name) of a scanner, such as "device-a-sado-mf". The scan image storing location field 540 stores information regarding a scan image storing location. The content in the scan image storing location field 540 is the identifier of a location to which the scan image is uploaded, such as a uniform resource locator (URL) "cloud://local.net/yamaguchi/scandata/" indicating a storing location in the image storing server 240.

Referring back to FIG. 4, in step S404, the image processing device 100 stores the identifier and the scan instruction information received in step S402. Note that if the content in the scan executing device field 530 and the identifier of the image processing device 100 are different from each other as a result of comparison, an error message (e.g., a message indicating that the address is different) may be transmitted to the user terminal 200.

Note that the process according to the flowchart illustrated in the example of FIG. 4 may be performed plural times prior to scanning. In this case, plural scan instruction information tables 500 are stored in the image processing device 100, and each one is distinguished from another by the identifier in the identifier field 510.

FIG. 6 is a flowchart illustrating a part of the process example according to the exemplary embodiment, which corresponds to step S306 and step S308 illustrated in the example of FIG. 3.

In step S602, the image reading module 110 receives a scan instruction through an operation performed by the scan executor 390.

In step S604, the reception module 130 receives the identifier through an operation performed by the scan executor 390.

Note that either of step S602 and step S604 may be performed earlier than the other.

In step S606, the acquisition module 140 acquires the scan instruction information associated with the identifier received in step S604.

In step S608, the setting module 150 performs setting of the image reading module 110 in accordance with the scan instruction information (specifically, the content in the scan instruction information field 520).

In step S610, the image reading module 110 in which the setting has been performed in accordance with the scan instruction information reads an image.

In step S612, the transmission module 160 transmits the scan image to a scan image storing location (specifically, the scan image storing location indicated in the scan image storing location field 540).

FIG. 7 is a flowchart illustrating a part of the process example according to the exemplary embodiment (the image processing device 100, the image storing server 240, and the user terminal 200).

In step S702, the user terminal 200 creates the scan instruction information table 500 in accordance with an operation performed by the scan client 380.

In step S704, the user terminal 200 transmits the scan instruction information table 500 to the image processing device 100.

In step S706, the image processing device 100 stores the scan instruction information table 500 in a queue.

In step S708, the scan client 380 notifies the scan executor 390 of the identifier. As described above, for example, the notification may be over the telephone.

In step S710, the scan executor 390 receives the identifier.

In step S712, the scan executor 390 places a document to be scanned on the image processing device 100. For example, the scan executor 390 places the document on a platen or a paper advance device.

In step S714, the image processing device 100 detects a pressing of a scan menu button.

In step S716, the image processing device 100 displays an identifier reception screen.

In step S718, the reception module 130 receives the identifier through an operation performed by the scan executor 390.

In step S720, the acquisition module 140 extracts the scan instruction information associated with the identifier.

In step S722, the acquisition module 140 determines whether or not the received identifier and the identifier associated with the scan instruction information are identical to each other. If the received identifier and the identifier associated with the scan instruction information are identical to each other, the process proceeds to step S724; if not, the process proceeds to step S734.

In step S724, the setting module 150 performs setting of the image reading module 110 in accordance with the scan instruction information.

In step S726, the image processing device 100 detects a pressing of a scan button.

In step S728, the image reading module 110 executes scanning.

In step S730, the transmission module 160 transfers the scan image to the image storing server 240.

In step S732, the image storing server 240 stores the scan image.

In step S734, scanning is cancelled.

Figure 8:
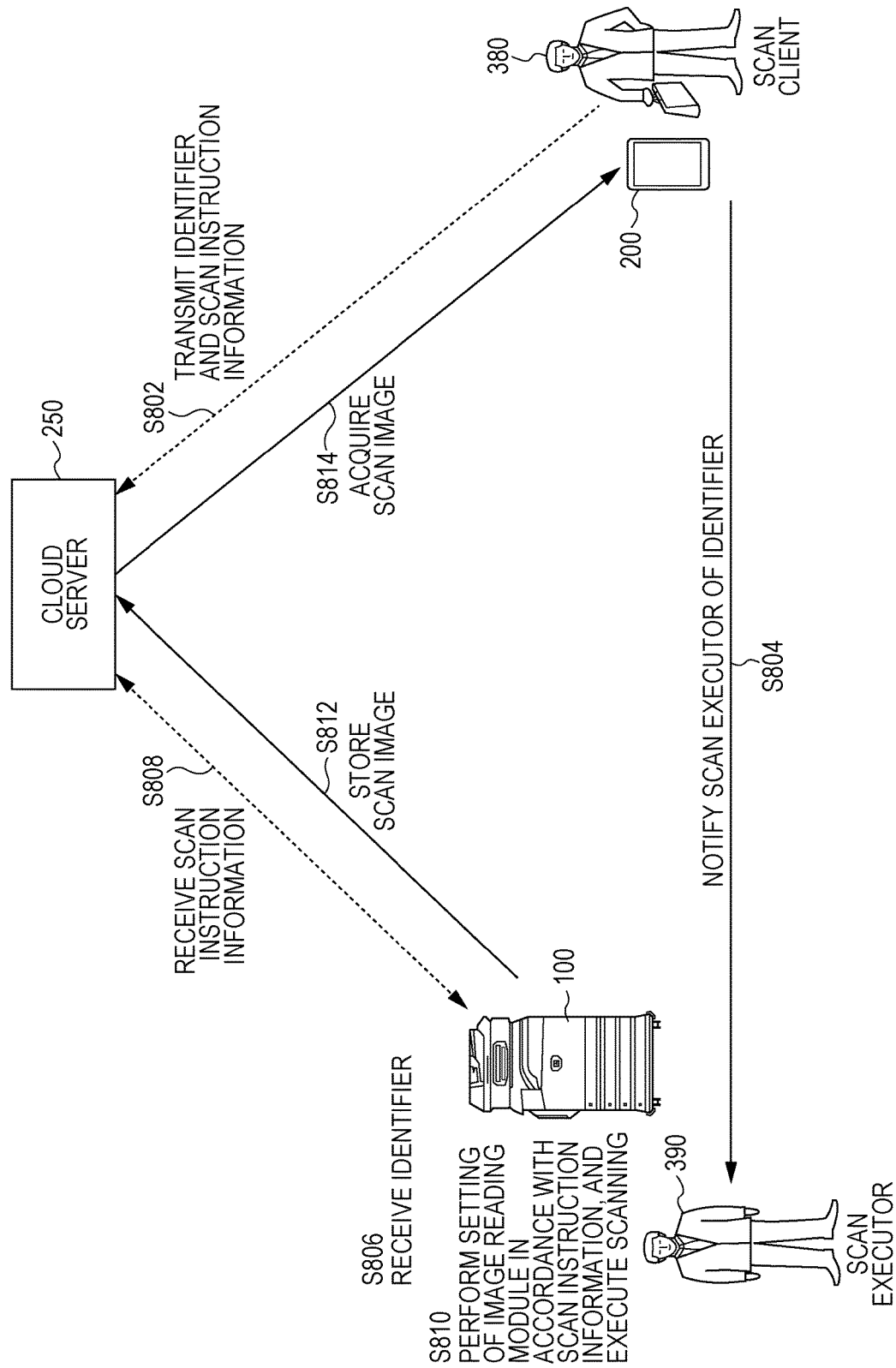
FIG. 8 illustrates a process example according to the exemplary embodiment.

FIG. 8 illustrates a process example according to the exemplary embodiment, which corresponds to the example illustrated in FIG. 2B. According to the exemplary embodiment, the image processing device 100, the user terminal 200, and the cloud server 250 are connected to one another via a communication line. Note that the image processing device 100 is a scanner specified in the scan executing device field 530.

In step S802, the user terminal 200 transmits an identifier and scan instruction information to the cloud server 250 in accordance with an instruction issued by the scan client 380. The information transmitted here is the scan instruction information table 500 illustrated in the example of FIG. 5.

In step S804, the scan client 380 notifies the scan executor 390 of the identifier. As described above, for example, the notification may be over the telephone.

Note that either of step S802 and step S804 may be performed earlier than the other.

In step S806, the image processing device 100 receives the identifier through an operation performed by the scan executor 390. Then, the image processing device 100 transmits the identifier to the cloud server 250. The cloud server 250 extracts the scan instruction information associated with the identifier.

In step S808, the image processing device 100 receives the scan instruction information associated with the identifier from the cloud server 250.

In step S810, the image processing device 100 performs setting of the image reading module 110 in accordance with scan parameters included in the scan instruction information and executes scanning to generate a scan image.

In step S812, the image processing device 100 stores the scan image in the cloud server 250, which is the storing location according to the scan instruction information.

In step S814, the user terminal 200 acquires the scan image from the cloud server 250.

FIG. 9 is a flowchart illustrating a part of the process example according to the exemplary embodiment (the image processing device 100, the cloud server 250, and the user terminal 200).

In step S902, the user terminal 200 creates the scan instruction information table 500 in accordance with an operation performed by the scan client 380.

In step S904, the user terminal 200 transmits the scan instruction information table 500 to the cloud server 250.

In step S906, the cloud server 250 stores the scan instruction information table 500 in a queue.

In step S908, the scan client 380 notifies the scan executor 390 of the identifier. As described above, for example, the notification may be over the telephone.

In step S910, the scan executor 390 receives the identifier.

In step S912, the scan executor 390 places a document to be scanned on the image processing device 100. For example, the scan executor 390 places the document on a platen or a paper advance device.

In step S914, the image processing device 100 detects a pressing of a cloud scan menu button.

In step S916, the image processing device 100 displays an identifier reception screen.

In step S918, the reception module 130 receives the identifier through an operation performed by the scan executor 390. The identifier is transmitted to the cloud server 250.

In step S920, the cloud server 250 extracts the scan instruction information associated with the identifier, and transmits the scan instruction information to the image processing device 100.

In step S922, the acquisition module 140 determines whether or not the received identifier and the identifier associated with the scan instruction information are identical to each other. If the received identifier and the identifier associated with the scan instruction information are identical to each other, the process proceeds to step S924; if not, the process proceeds to step S934.

In step S924, the setting module 150 performs setting of the image reading module 110 in accordance with the scan instruction information.

In step S926, the image processing device 100 detects a pressing of a scan button.

In step S928, the image reading module 110 executes scanning.

In step S930, the transmission module 160 transfers the scan image to the cloud server 250.

In step S932, the cloud server 250 stores the scan image.

In step S934, scanning is cancelled.

FIG. 10 is a flowchart illustrating a part of the process example according to the exemplary embodiment (the image processing device 100, the cloud server 250, and the user terminal 200). In the flowchart illustrated in the example of FIG. 9, the scan instruction information is received after reception of the identifier. However, in the flowchart illustrated in example of FIG. 10, upon reception of the scan instruction information table 500 by the cloud server 250, the scan instruction information table 500 is transmitted to the scanner indicated in the scan executing device field 530.

In step S1002, the user terminal 200 creates the scan instruction information table 500 in accordance with an operation performed by the scan client 380.

In step S1004, the user terminal 200 transmits the scan instruction information table 500 to the cloud server 250.

In step S1006, the cloud server 250 stores the scan instruction information table 500 in a queue.

In step S1008, the cloud server 250 extracts scan instruction information corresponding to the image processing device 100 and transmits the scan instruction information to the image processing device 100 (the scanner indicated in the scan executing device field 530).

In step S1010, the scan client 380 notifies the scan executor 390 of the identifier. As described above, for example, the notification may be over the telephone.

In step S1012, the scan executor 390 receives the identifier.

In step S1014, the scan executor 390 places a document to be scanned on the image processing device 100. For example, the scan executor 390 places the document on a platen or a paper advance device.

In step S1016, the image processing device 100 detects a pressing of a cloud scan menu button.

In step S1018, the image processing device 100 displays an identifier reception screen.

In step S1020, the reception module 130 receives the identifier.

In step S1022, the acquisition module 140 determines whether or not the received identifier and the identifier associated with the scan instruction information are identical to each other. If the received identifier and the identifier associated with the scan instruction information are identical to each other, the process proceeds to step S1024; if not, the process proceeds to step S1032.

In step S1024, the setting module 150 performs setting of the image reading module 110 in accordance with the scan instruction information.

In step S1026, the image processing device 100 detects a pressing of a scan button.

In step S1028, the image reading module 110 executes scanning.

In step S1030, the transmission module 160 transfers the scan image to the cloud server 250.

In step S1032, the cloud server 250 stores the scan image.

In step S1034, scanning is cancelled.

FIG. 11 illustrates a data structure example of a scan instruction information table 1100. The scan instruction information table 1100 is obtained by adding a scan client field 1150 to the scan instruction information table 500.

The scan instruction information table 1100 includes an identifier field 1110, a scan instruction information field 1120, a scan executing device field 1130, a scan image storing location field 1140, and the scan client field 1150. The identifier field 1110, the scan instruction information field 1120, the scan executing device field 1130, the scan image storing location field 1140 respectively correspond to the identifier field 510, the scan instruction information field 520, the scan executing device field 530, the scan image storing location field 540 in the scan instruction information table 500 illustrated in the example of FIG. 5. The scan instruction information field 1120 includes a scan size field 1122, a color/monochrome field 1124, a resolution field 1126, and a document-type field 1128. The identifier field 1110 stores the identifier. The scan instruction information field 1120 stores scan instruction information. The scan size field 1122 stores a scan size. The color/monochrome field 1124 stores information regarding color/monochrome/etc. specification. The resolution field 1126 stores a resolution. The document-type field 1128 stores a document type. The scan executing device field 1130 stores information regarding a scan executing device. The scan image storing location field 1140 stores information regarding a scan image storing location. The scan client field 1150 stores the name (e.g., "Tanaka Ichiro") of the scan client 380.

Figure 12:
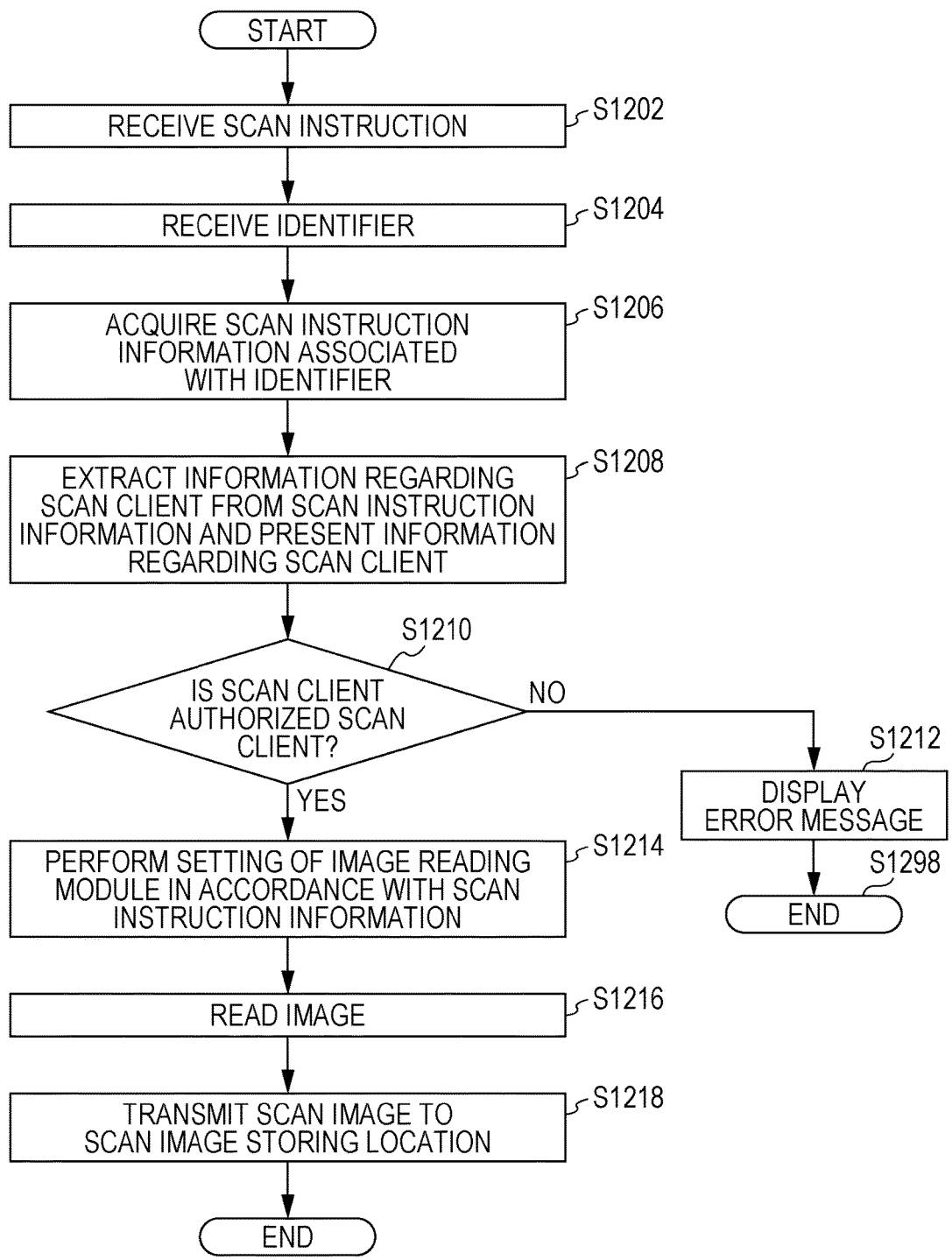
FIG. 12 is a flowchart illustrating a part of the process example according to the exemplary embodiment.

FIG. 12 is a flowchart illustrating a part of the process example according to the exemplary embodiment, which is a process example using the scan instruction information table 1100.

In step S1202, the image reading module 110 receives a scan instruction through an operation performed by the scan executor 390.

In step S1204, the reception module 130 receives the identifier through an operation performed by the scan executor 390.

Note that either of step S1202 and step S1204 may be performed earlier than the other.

In step S1206, the acquisition module 140 acquires the scan instruction information associated with the identifier received in step S1204.

In step S1208, the notification module 170 extracts information regarding the scan client from the scan instruction information and presents the information regarding the scan client.

In step S1210, the notification module 170 allows the scan executor 390 to verify whether or not the scan client is an authorized scan client. If the scan executor 390 performs an operation indicating that the scan client is an authorized client, the process proceeds to step S1214; if not, the process proceeds to step S1212.

In step S1212, the notification module 170 displays an error message, and the process ends (step S1298).

In step S1214, the setting module 150 performs setting of the image reading module 110 in accordance with the scan instruction information (specifically, the content in the scan instruction information field 1120).

In step S1216, the image reading module 110 in which the setting has been performed in accordance with the scan instruction information reads an image.

In step S1218, the transmission module 160 transmits the scan image to a scan image storing location (specifically, the scan image storing location indicated in the scan image storing location field 1140).

Figure 13:
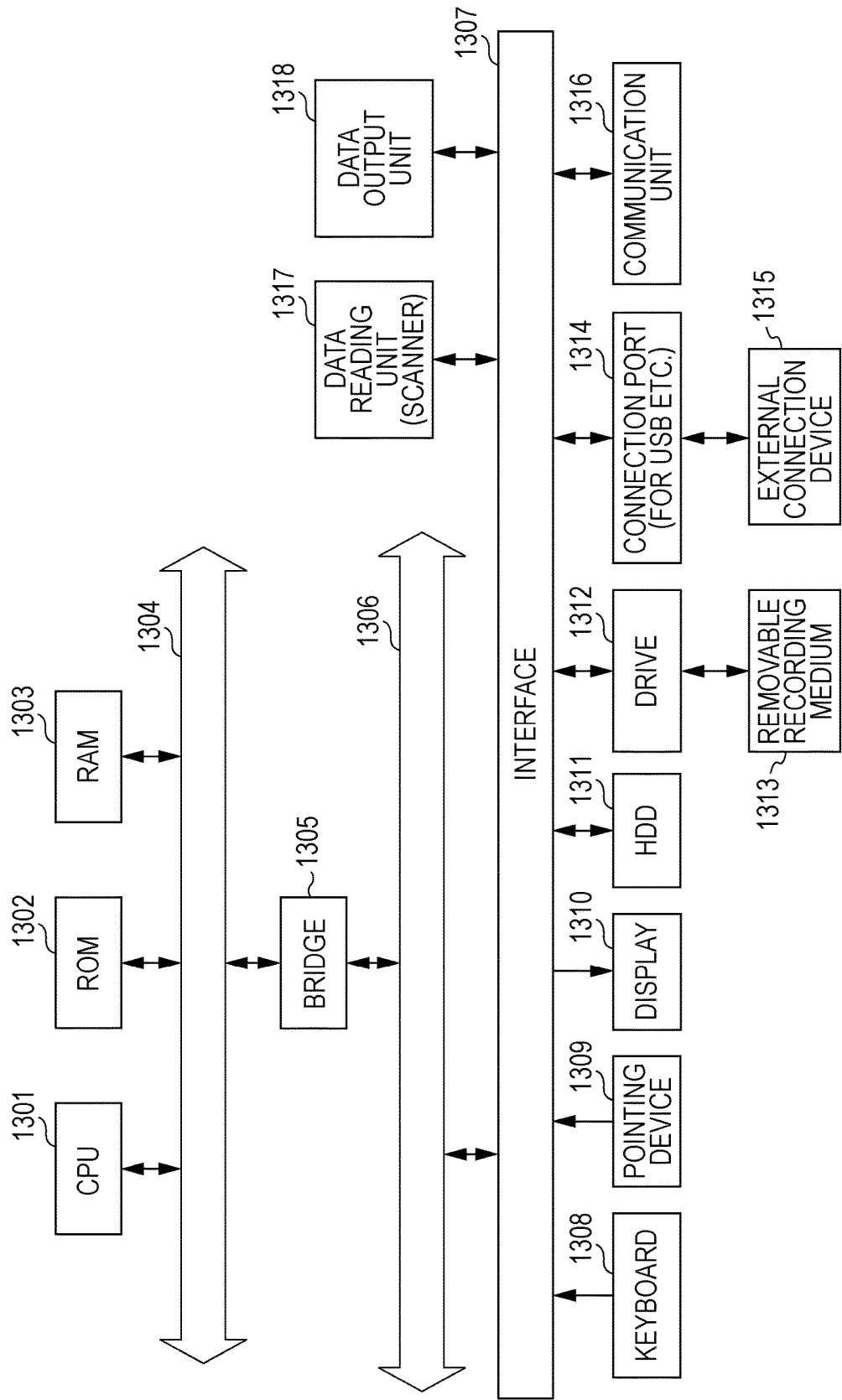
FIG. 13 is a block diagram illustrating a hardware configuration example of a computer realizing the exemplary embodiment.

A hardware configuration example of an image processing device according to the exemplary embodiment will be described with reference to FIG. 13. The configuration illustrated in FIG. 13 is a hardware configuration example that is realized by, for example, a personal computer (PC) and that includes a data reading unit 1317, such as a scanner, and a data output unit 1318, such as a printer.

A central processing unit (CPU) 1301 is a control unit that executes processes in accordance with computer programs that describe sequences of executing the modules described above in the exemplary embodiment, in other words, the following modules: the scan instruction executing module 120, the reception module 130, the acquisition module 140, the setting module 150, the transmission module 160, the notification module 170, the communication module 180, and the like.

A read only memory (ROM) 1302 stores programs, operating parameters, and the like used by the CPU 1301. A random access memory (RAM) 1303 stores programs used in the execution of the CPU 1301, parameters that change appropriately in the execution, and the like. The CPU 1301, the ROM 1302, and the RAM 1303 are connected to one another via a host bus 1304, such as a CPU bus.

The host bus 1304 is connected to an external bus 1306, such as a peripheral component interconnect/interface (PCI) bus, via a bridge 1305.

A keyboard 1308 and a pointing device 1309, such as a mouse, are devices manipulated by an operator. A display 1310, such as a liquid crystal display device or a cathode ray tube (CRT), displays various kinds of information as text or image information. The display 1310 may be a touch screen, for example, having the functions of both the pointing device 1309 and the display 1310.

A hard disk drive (HDD) 1311 includes a built-in hard disk (a flash memory or the like is also possible) and drives and causes the hard disk to record or reproduce information and programs executed by the CPU 1301. The hard disk stores a scan image, processing information (including scan parameters and information regarding an image storing location), and the like. Furthermore, the hard disk also stores other various kinds of data, various computer programs, and the like.

A drive 1312 reads data or programs recorded on a removable recording medium 1313, such as a loaded magnetic disk, optical disc, magneto-optical disk, or semiconductor memory, and supplies the data or programs to the RAM 1303 connected to the drive 1312 via an interface 1307, the external bus 1306, the bridge 1305, and the host bus 1304. Note that the removable recording medium 1313 is also usable as a data recording region.

A connection port 1314 is a port to be connected to an external connection device 1315 and includes a connection portion for a USB or IEEE 1394 connector, for example. The connection port 1314 is connected to, for example, the CPU 1301 via the interface 1307, the external bus 1306, the bridge 1305, the host bus 1304, and the like. A communication unit 1316 is connected to a communication line and executes data communication processes with external devices. The data reading unit 1317 is a scanner, for example, and executes a document reading process. The data output unit 1318 is a printer, for example, and performs a document data output process.

The hardware configuration of the image processing device illustrated in FIG. 13 is one of exemplary configurations. The exemplary embodiment is not limited to the configuration illustrated in FIG. 13 and may be any configuration as long as it is possible to execute the modules described in the exemplary embodiment. For example, some modules may be configured by dedicated hardware (e.g., application specific integrated circuit (ASIC)), some modules may be included in an external system and may be connected to the image processing device via a communication line, and plural systems illustrated in FIG. 13 may be connected to one another via a communication line and may operate in cooperation with one another. In particular, some modules may be incorporated in a copying machine, a facsimile, a scanner, a printer, a multifunction peripheral (an image processing device having any two or more of a scanner function, a printer function, a copying machine function, a facsimile function, and the like), and the like.

The above-described program may be provided by being stored in a recording medium. Alternatively, the program may be provided by using a communication unit. In such a case, for example, the program may correspond to a computer readable recording medium storing a program.

The term "computer readable recording medium storing a program" refers to a computer readable recording medium that stores a program and that is used to, for example, install, execute, and distribute the program.

Examples of the recording medium include the following: a digital versatile disc (DVD), such as "DVD-R, DVD-RW, DVD-RAM, and the like" as standardized by the DVD Forum or "DVD+R, DVD+RW, and the like" as standardized by the DVD+RW Alliance; a compact disc (CD), such as a CD read only memory (CD-ROM), a CD recordable (CD-R), or a CD rewritable (CD-RW); a Blu-ray Disc (registered trademark); a magneto-optical disk (MO); a flexible disk (FD); a magnetic tape; a hard disk; a read only memory (ROM); an electrically erasable programmable read only memory (EEPROM) (registered trademark); a flash memory; a random access memory (RAM); and a secure digital (SD) memory card.

A part or all of the program may be, for example, recorded on the recording medium and stored or distributed. Alternatively, a part or all of the program may be transmitted by communication using a transmission medium, such as a wired network used for a local area network (LAN), a metropolitan area network (MAN), a wired area network (WAN), the Internet, an intranet, or an extranet; a wireless communication network; or a combination thereof. Further alternatively, a part or all of the program may be transmitted on a carrier wave.

The above-described program may be a part or all of another program, or may be recorded on a recording medium together with another program. The program may be divided into sub-parts and recorded on plural recording media. The program may be recorded in any form, such as by being compressed or encrypted, as long as it is possible to restore the program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a processor configured to function as a reception unit, an acquisition unit, and a transmission unit; and
an image reader, wherein:
the reception unit receives a processing identifier identifying a specific image reading processing job of an image to be read, the processing identifier being associated with a current storage location of the image to be read;
the acquisition unit acquires processing information that has been specified for the image processing job and is associated with the processing identifier, the processing information including at least information regarding a storing location and parameters defining image characteristics of the image;
the image reader reads the image on the basis of the processing information; and
the transmission unit transmits data of the read image to the storing location according to the processing information.

2. The image processing device according to claim 1, wherein the transmission unit displays the information regarding the storing location prior to transmitting the data of the read image, and transmits the data of the read image to the storing location upon reception of a confirmation operation.

3. The image processing device according to claim 1, wherein the acquisition unit acquires the processing information associated with the processing identifier from a server.

4. The image processing device according to claim 3, wherein the processing information further includes scan parameters and, if the scan parameters included in the processing information are not appropriate for image reading, the transmission unit transmits, to the server, information indicating that the scan parameters included in the processing information are not appropriate for image reading.

5. The image processing device according to claim 1, wherein the image reader displays, upon reception of the processing identifier, information regarding a client according to the processing information associated with the processing identifier, and reads, upon reception of a confirmation operation, the image on the basis of the processing information.

6. The image processing device according to claim 1, wherein the specific image reading processing job is stored in a queue prior to the image reader reading the image.

7. An image processing method comprising:
   receiving a processing identifier associated with a specific image reading processing job of an image to be read, the processing identifier being associated with a current storage location of the image to be read;
   acquiring processing information that has been specified for the image processing job and identifies the processing identifier, the processing information including at least information regarding a storing location and parameters defining image characteristics of the image;
   reading the image on the basis of the processing information; and
   transmitting data of the read image to the storing location according to the processing information.

8. A non-transitory computer readable medium storing a program causing a computer to execute a process for image processing, the process comprising:
   receiving a processing identifier identifying a specific image reading processing job of an image to be read, the processing identifier being associated with a current storage location of the image to be read;
   acquiring processing information that has been specified for the image processing job and is associated with the processing identifier, the processing information including at least information regarding a storing location and parameters defining image characteristics of the image;
   reading the image on the basis of the processing information; and
   transmitting data of the read image to the storing location according to the processing information.

* * * * *